(12) United States Patent
Holy et al.

(10) Patent No.: US 8,254,020 B2
(45) Date of Patent: Aug. 28, 2012

(54) OBJECTIVE-COUPLED SELECTIVE PLANE ILLUMINATION MICROSCOPY

(75) Inventors: Timothy E. Holy, St. Louis, MO (US); Terrence F. Holekamp, St. Louis, MO (US)

(73) Assignee: Washington University, St. Louis, MO (US)

( * ) Notice: Subject to any disclaimer, the term of this patent is extended or adjusted under 35 U.S.C. 154(b) by 751 days.

(21) Appl. No.: 12/297,716

(22) PCT Filed: Apr. 20, 2007

(86) PCT No.: PCT/US2007/067115
§ 371 (c)(1),
(2), (4) Date: Feb. 4, 2009

(87) PCT Pub. No.: WO2007/124437
PCT Pub. Date: Nov. 1, 2007

(65) Prior Publication Data
US 2009/0174937 A1    Jul. 9, 2009

Related U.S. Application Data

(60) Provisional application No. 60/793,363, filed on Apr. 20, 2006.

(51) Int. Cl.
*G02B 21/06* (2006.01)
(52) U.S. Cl. .......................... 359/385; 359/368; 359/390
(58) Field of Classification Search .......... 359/368–390, 359/363
See application file for complete search history.

(56) References Cited

U.S. PATENT DOCUMENTS

| 1,973,066 | A  | * | 9/1934  | Hauser et al. ............... 359/390 |
| 3,868,171 | A  | * | 2/1975  | Hoppl ........................ 359/384 |
| 5,774,224 | A  | * | 6/1998  | Kerstens .................... 356/394 |
| 6,399,935 | B1 |   | 6/2002  | Jovin et al. |
| 8,059,336 | B2 | * | 11/2011 | Ptitsyn et al. ............... 359/368 |
| 2003/0137724 | A1 | * | 7/2003 | Tonooka ..................... 359/385 |
| 2003/0184730 | A1 | * | 10/2003 | Price ............................ 356/39 |
| 2006/0181700 | A1 | * | 8/2006 | Andrews et al. .......... 356/237.2 |

OTHER PUBLICATIONS

International Search Report and Written Opinion in PCT/US07/67115 dated May 19, 2008 (9 pages).

* cited by examiner

*Primary Examiner* — Thong Nguyen
(74) *Attorney, Agent, or Firm* — Polsinelli Shughart PC

(57) ABSTRACT

A microscope assembly includes an illumination source coupled to an optical assembly by a coupler. The optical assembly includes an objective with optics that move along an optic axis. The illumination source generates a light blade that illuminates a portion of a sample at an illumination plane. The light blade induces a fluorescent emission from the sample that is projected through the objective optics to a detector. The focal plane of the objective optics is fixed with respect to the illumination source by the coupler so that the illumination plane is coincident with the focal plane as the objective optics move along the optic axis. The objective and illumination may be rapidly scanned along the optic axis to provide rapid three-dimensional imaging while the objective and illumination may also be rapidly scanned along the optic axis to provide rapid three-dimensional imaging.

18 Claims, 4 Drawing Sheets

OBJECTIVE-COUPLED SELECTIVE PLANE ILLUMINATION MICROSCOPY

FEDERALLY SPONSORED RESEARCH OR DEVELOPMENT

The present invention was made, at least in part, with funding from the National Institutes of Health, NIH Grant 1 R01 DC005964-01A1 (Holy). Accordingly, the United States government may have certain rights in this invention.

BACKGROUND

Many biological or medical phenomena are studied using optical imaging. Optical imaging, most often in the form of microscopy, can yield insights at cellular and sub-cellular levels as well as over coarser scales.

Particular proteins or other cellular components can be tagged with a fluorescent dye for study by fluorescence microscopy. Alternatively, dyes that change their fluorescence depending on calcium levels, pH, membrane voltage, or other physical or chemical characteristics can be used to report on biological phenomena such as the activity of neurons.

One frequent approach to studying these phenomena is to use wide-field illumination, often called epifluorescence. However, this optical method is not suited for studying individual cells in densely-labeled, three-dimensional tissues: these optical methods do not reject out-of-focus light, resulting in a hazy and unfocused fluorescence. The light used in these techniques is not restricted to the region of interest.

Other techniques, such as confocal or two-photon microscopy, reject out-of-focus light and achieve a higher signal-to-noise level. However, these techniques encounter serious difficulties in studying the activity of entire populations of neurons or neural circuits, largely because of their intrinsically slow rate of data collection and/or rapid photo bleaching of the sample.

An alternative to confocal and two-photon microscopy are systems that employ planar illumination. These systems often are used to image samples that are placed in a gel or other liquid substance. The samples are placed in a sample chamber, and a light source generates a light plane sideways into the sample or sample chamber, such as along a horizontal axis. A camera may be placed along a vertical axis so that it is directly above the sample chamber. The sample chamber is then rotated or otherwise moved to image sections of the sample.

This method results in several problems. First, only small samples are effectively sectioned, because the light might otherwise have to propagate through many centimeters of tissue. Also, because the optics and camera are placed above the sample and the sample must be moved to obtain sectioned images, a three-dimensional image can only be acquired slowly. Additionally, samples in the gel or other liquid move as the sample chamber moves. This can blur sample images and does not provide accurate sample images.

Consequently, new systems and methods are needed for optically studying and/or recording entire neural circuits in mammals. In addition, new systems and methods are needed for optically imaging tissues for a variety of technologies, including surgical applications and other real-time three-dimensional microscopy.

SUMMARY

In one embodiment, a microscope assembly may include an illumination source coupled to an optical assembly by a coupler. The optical assembly may include an objective with optics that move along an optic axis. The illumination source may generate a light blade that illuminates a portion of a sample at an illumination plane. The light blade can induce a fluorescent emission from the sample that is projected through the objective optics to a detector. In other embodiments, the light from a laser or other source propagates through free space to the optics that create the light blade. The focal plane of the objective optics may be fixed with respect to the illumination source by the coupler so that the illumination plane is coincident with the focal plane as the objective optics move along the optic axis. In one embodiment, the coupler is a mechanical arrangement that physically connects the illumination optics to the objective, while in another embodiment the coupling is achieved by a control system that electronically insures the illumination optics maintain a fixed relationship relative to the focal plane of the objective. In one aspect, the objective and illumination may be rapidly scanned along the optic axis to provide rapid three-dimensional imaging. The microscope assembly may be tilted in some embodiments so that the illumination plane illuminates the sample at an angle, thereby improving the projection from the sample that is detected by the detector. In an embodiment, the illumination source may include fiber and a fiber optic assembly coupled to the objective. In this embodiment, the fiber carries light from a laser to the fiber optic assembly which focuses the light to a thin light blade at the focal plane.

DETAILED DESCRIPTION

Objective-coupled planar illumination restricts the illumination of a sample to the focal plane of a microscope objective lens. Objective-coupled planar illumination therefore performs optical sectioning using a thin "blade" of light to restrict illumination near the focal plane. The light blade generally is produced using a cylindrical lens to focus light from a laser or other illumination source. In one implementation, an optical fiber carries the light from the laser to the cylindrical lens. Producing the light blade with a cylindrical lens results in weak convergence in one, but not the other, dimension of the collimated output of a fiber-coupled laser.

Because of diffraction, the light blade is not arbitrarily thin. If a sample has a constant thickness d, then the minimum width of the blade is of the order $\sqrt{\lambda d}$, where $\lambda$ is the wavelength of light. In one example, a light blade's width is in the range of 5-10 micrometers ($\mu$m), which will produce effective optical sectioning.

Objective-coupled planar illumination excites only the in-focus portion of the sample, and therefore has a major advantage over confocal microscopy in reducing phototoxicity of the sample since fewer photons impact the sample. Accordingly, samples may be imaged for much longer durations without damage.

Because the entire focal plane is illuminated simultaneously, an entire image can be acquired using objective-coupled planar illumination rather than a single pixel. This permits an increase in multiple orders of magnitude the rate at which individual images can be acquired. Unlike confocal or two-photon microscopy, there is no forced tradeoff between imaging speed, size of the imaged area, and signal-to-noise ratio. Thus, in practice, higher signal-to-noise images are obtained using this type of planar illumination than using confocal microscopy and other methods.

Figure 1:
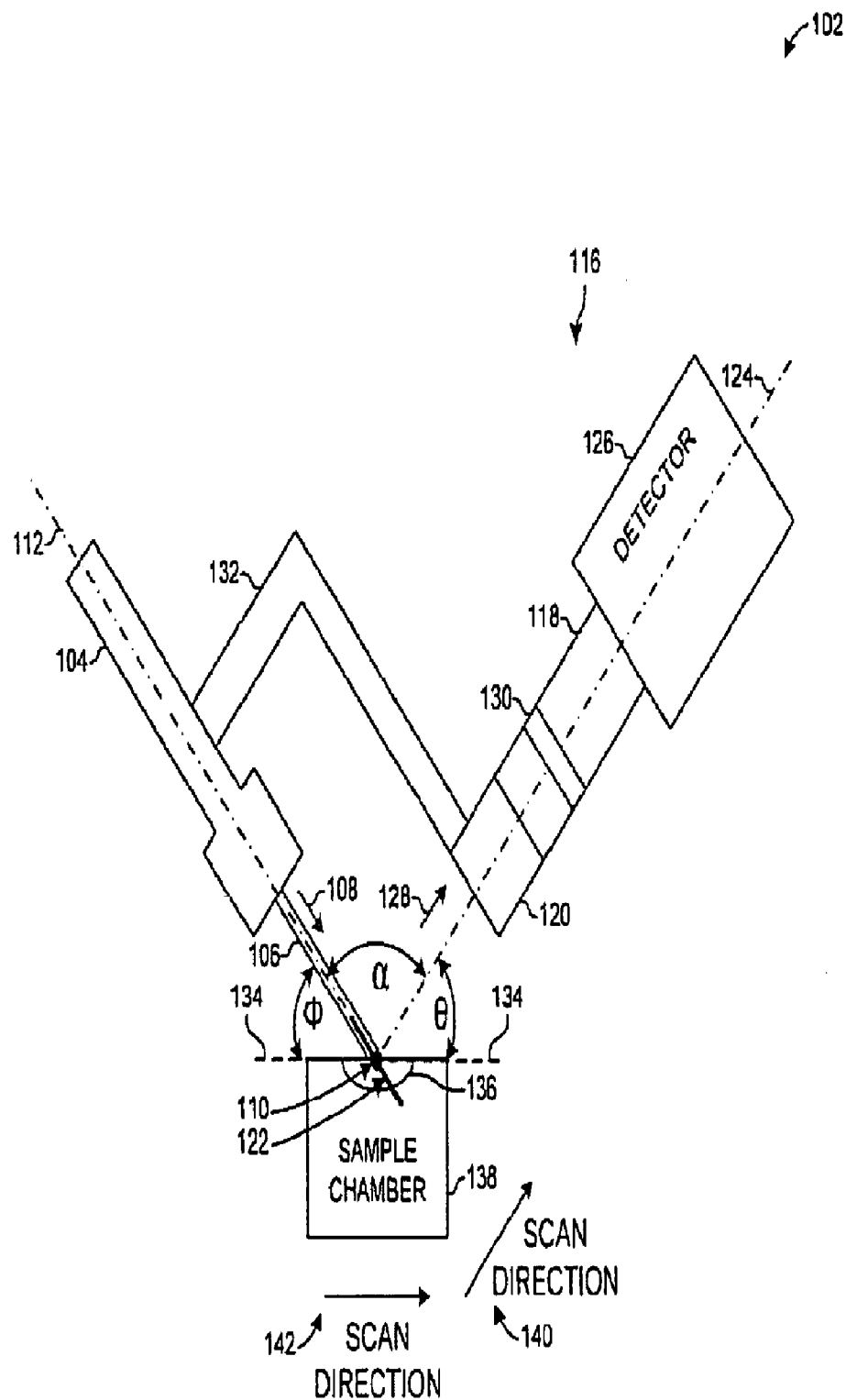
FIG. 1 is a simplified block diagram of a microscope system.

FIG. 1 depicts an embodiment of a microscope assembly 102. The microscope assembly 102 may be used for optical sectioning, including producing two-dimensional images of a sample section and using the images to reconstruct a three-dimensional image of the sample. The microscope assembly 102 may include an illumination source 104 that generates a blade of light 106 along an illumination path 108 to an illumination plane 110. The illumination path 108 generally corresponds to an illumination axis 112 of the illumination source 104.

In one embodiment, the illumination source 104 may include fiber that carries a light beam to an optic assembly 116. In this embodiment, a laser (not shown) may generate the light beam. In another embodiment, the illumination source 104 may be a laser that generates a collimated light beam through the optic assembly 116. In still another embodiment, the illumination source 104 may include a laser that propagates light through space to the optic assembly 116. In yet another embodiment, the illumination source 104 may include the optic assembly 116 that receives light propagated through space or another carrier, such as light generated from a laser and propagated through space to the optic assembly. Other illumination sources, such as light-emitting diodes, may also be used.

As shown, the optic assembly 116 may include a cylindrical lens or other lens or focusing device that focuses the light beam into the thin light blade 106 and to the illumination plane 110. Other optic assemblies employing other lens types, such as graded-index (GRIN) lenses, may also be used to focus the light to a light blade and to an illumination plane. The microscope assembly 102 may further include an optical assembly 116 with an optical tube 118 and an objective 120 having an objective lens, other optics, or another focusing device capable of focusing at a focal plane 122 along an optic axis 124.

The optical assembly 116 may include a detector 126 that detects images projected from the focal plane 122 along a detection path 128 through the objective 120. In one embodiment, the detection path 128 corresponds with the optic axis 124. An optional excitation cutoff filter 130 may be provided that enables selective wavelengths of light to be detected by the detector 126. Other optional filters such as dichroic mirrors may be included in the optical assembly 116 or the illumination source 104.

In one embodiment, the detector 126 may be a digital camera. For example, the detector 126 may be a charge-coupled device (CCD) camera. In another embodiment, the detector 126 may be a person with eyes such that the person may view an image or the sample through the microscope assembly 102, such as through eyepieces. The detector 126 may be connected or removably connected to the optical tube 118 in some embodiments. In other embodiments, a connection may carry projected images to the detector 126. In yet other embodiments, components of the detector 118 may be distributed.

A coupler 132 may couple the illumination source 104 and the objective 120 so the illumination source is fixed relative to the objective. In one embodiment, the coupling results in an angle alpha (α) between the illumination axis 112 and the optic axis 124 that is approximately orthogonal. However, the coupling angle α may vary in other embodiments. The coupler 132 fixes the separation between the focal plane 122 of the objective 120 and the illumination plane 110 of the illumination source 104. The illumination plane 110 illuminates only the focal plane 122 and excites only the in-focus portion of a sample. The thin light blade 106 is, therefore, coincident with or restricted to the focal plane 122.

The coupler 132 couples the illumination source 104 to the objective 120 so that as the objective is focused in or out, the illumination plane 110 concurrently moves in and out with the focal plane 122 of the objective. Moving the objective 120 along the optic axis 124 moves the coupler 132 and the illumination source 104 along the same axis. In one embodiment, the coupler 132 may movably couple the illumination source 104 to the objective 120 of the optical assembly so that the illumination source and the objective are movably fixed with respect to each other. The microscope assembly 102 may be manufactured so that the illumination source 104 and the objective 120 are physically coupled by the coupler 132 at a fixed coupling angle or a selectable coupling angle.

In another embodiment, the coupler 132 may couple the illumination source 104 and another portion of the optical assembly 116 so that the illumination source is fixed relative to the optical assembly. The coupling results in an angle alpha (.alpha.) between the illumination axis 112 and the optic axis 124 that is approximately orthogonal in one example. However, the coupling angle .alpha. may vary in other examples.

In this embodiment, the coupler 132 may fix the separation between the focal plane 122 of the objective 120 and the illumination plane 110 of the illumination source 104. The illumination plane 110 illuminates only the focal plane 122 and excites only the in-focus portion of a sample. The thin light blade 106 is, therefore, coincident with or restricted to the focal plane 122.

Because of the coupling, the illumination source 104 concurrently moves with the optical assembly 116 if the optical assembly is moved or vice-versa. In one example, the coupler 132 may physically couple the illumination source 104 to the optical tube 118. In another example, the coupler 132 may movably couple the illumination source 104 to the optical assembly 116 so that the illumination source 104 and the optical assembly 116 are movably fixed with respect to each other. The microscope assembly 102 may be manufactured so that the illumination source 104 and the optical assembly 116 are coupled by the coupler 132 at a fixed coupling angle or a selectable coupling angle.

Figure 4:
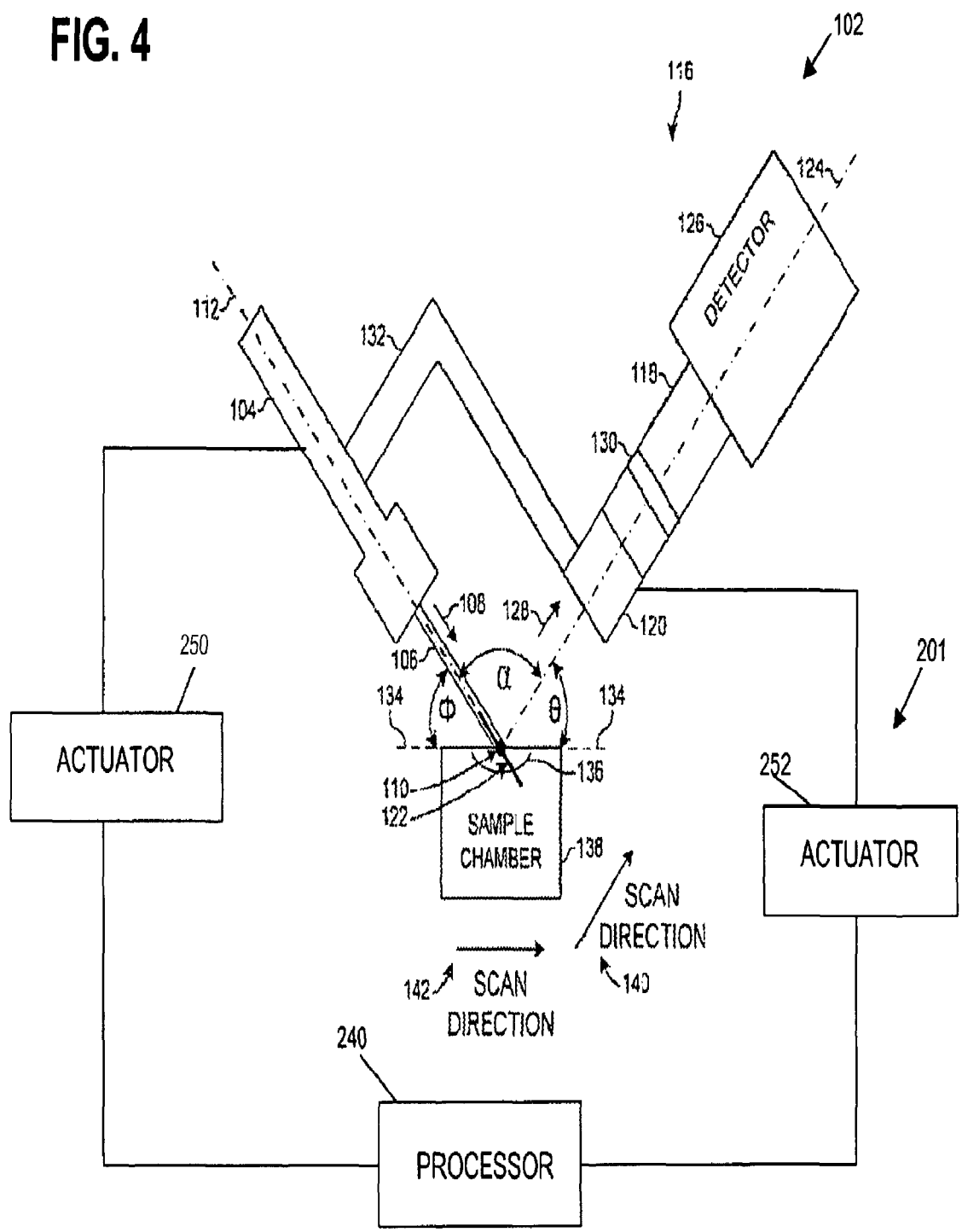
FIG. 4 is a simplified block diagram of an alternate embodiment of the microscope system.

In the embodiment shown in FIG. 1, the coupling 132 may be a rigid mechanical device that provides a fixed relationship between the illumination source 104 and the objective 120. In the alternative embodiment shown in FIG. 4, both the illumination source 104 and the objective 120 can be moved independently using an electronic control system 201 to insure that the increments of the illumination source 104 and the objective 120 are synchronized to maintain a fixed relationship. In particular, the electronic control system 201 may include a pair of actuators 250 and 252 operatively associated with the objective 120 and illumination source 104, respectively. Each actuator 250 and 252 are controlled by a respective control signal, such as a control voltage, generated by a processor 240 which is in operative association with actuators 250 and 252. In one embodiment, the actuators 250 and 252 are piezoelectric devices that maintain the illumination plane 110 in the focal plane 122 of the objective 120. In other embodiments, the control system 201 may include measurements of the real position of each actuator 250, 252 to facilitate the synchronization of the control systems.

Because the illumination source 104 is coupled to the objective 120 or another portion of the optical assembly 114, the entire microscope assembly 102 (not including the sample 136 and the sample chamber 138) may be raised, lowered, and rotated without moving the sample 136 or the sample chamber 138. Only the focal plane 122 and the illumination plane 110 need be moved. This enables a sample 136 to be more rapidly imaged than prior systems in which the sample 136 itself was raised, lowered, or rotated. A higher speed three-dimensional imaging of a sample 136 may be performed with the microscope assembly 102.

In one embodiment, the microscope assembly 102 may be tilted at a tilt angle theta ($\theta$). In one example, the tilt angle is an angle between the optic axis 124 and a reference plane 134. The reference plane 134 may be a reference plane 134 of a sample 136 in a sample chamber 138, a horizontal plane, or another reference plane. In one example, the tilt angle is 45 degrees. The sample reference plane in this example is parallel to a horizontal plane. However, the tilt angle may be greater or less than 45°. In another embodiment, the tilt angle is between 30 and 60 degrees, while in another embodiment, the tilt angle is between 0 and 90. The microscope assembly 102 may be manufactured so that the tilt angle $\theta$ is permanently fixed or selectable.

The tilt angle and the coupling angle result in the illumination source 104 emitting the light blade 106 to the sample 136 at an illumination angle phi ($\phi$). This angle of illumination $\phi$ results in the illumination plane 110 being restricted to the focal plane 122. This in turn results in a better sample projection along the detection path 128 to the detector 126 than if the sample was illuminated from the side, such as along a horizontal. The detector 126 therefore obtains better resolution of the sectioned images. In one embodiment, the illumination angle may be approximately between 30 and 60 degrees. In another example, the illumination angle may be 45 degrees. In other embodiments, the illumination source 104 may be configured to generate the thin light blade 106 to the sample 136 at an illumination angle when the tilt angle is zero or another angle and/or when the coupling angle is other than approximately orthogonal.

The microscope assembly 102 may be configured to scan in one or more directions. In one embodiment, the microscope assembly 102 scans in a scan direction 140 along the optic axis 124. In another embodiment, the microscope assembly 102 scans in a scan direction 142 along the reference plane 134 or another plane, such as the horizontal plane.

Scanning speed is significantly increased when scanning along the optic axis 124 because the illumination source 104, the objective 120, and the coupler 132 are relatively small in mass and move together along the optic axis 124. An alternative scanning direction, for example approximately along the sample reference plane 134, would also be fast if illumination source 104, the objective 120, and the coupler 132 move together in the scanning direction.

In one example, because the optics of the optic assembly 116 are positioned above the sample 136 larger samples 136 may be imaged. Further, tilting the microscope assembly 102, and thereby tilting the optical assembly 116, enables larger samples 136 to be imaged.

In one example of operation, the sample 136 may be located in a gel or liquid solution in the sample chamber 138. The coupler 132 physically couples the illumination source 104 to the objective 120 so that the illumination axis 112 is at an angle to the optic axis 124. In this example, the coupling angle $\alpha$ is approximately orthogonal. A tilt angle $\theta$ also may be selected. In this example, the tilt angle is approximately 45°.

The illumination source 104 generates a thin light blade 106 along an illumination path 108 to an illumination plane 110 that is fixed on the sample 136 at a focal plane of the objective 120. The illumination plane 110 induces fluorescence in the sample 136 at the focal plane 122. The emitted light is detected through the objective 120 along the detection path 128 at the detector 126. The sample 136 is repeatedly imaged in this fashion in a scan direction 140 along the optic axis 124 until each section of the sample 136 is optically imaged. In another example of operation, the sample 136 is repeatedly imaged in another scan direction 142 until each section of the sample 136 is optically imaged.

Figure 2:
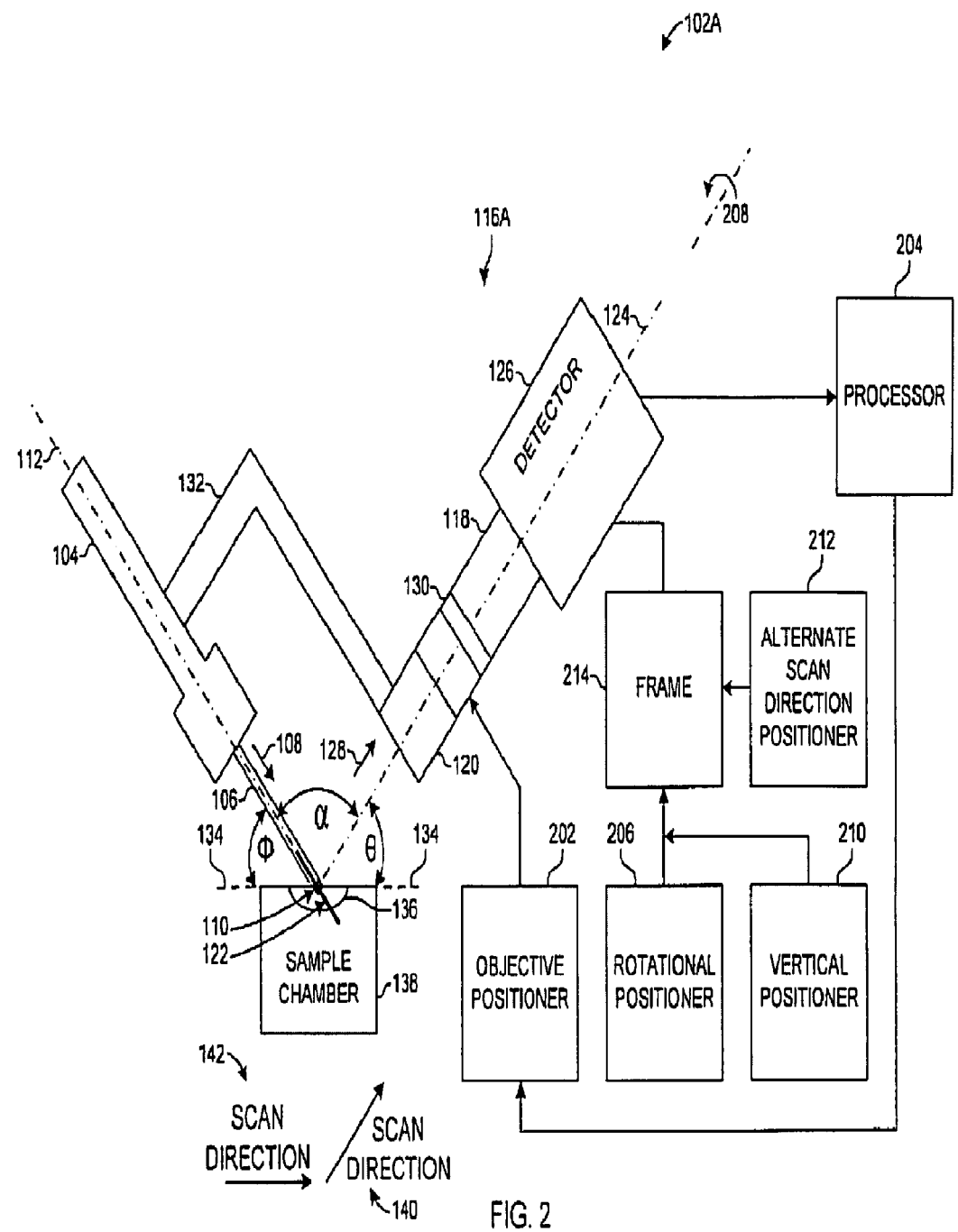
FIG. 2 is a simplified block diagram of another microscope system.

FIG. 2 depicts another embodiment of a microscope assembly, designated 102A. The microscope assembly 102A may include optional components for some embodiments, such as barrier filters (130).

The optical assembly 116 may include an objective positioner 202 that moves the objective 120 in and out along the optic axis 124. In some embodiments, the objective positioner 202 moves the coupled objective 120 and illumination source 104 in the scan direction 140. The objective positioner 202 may be a manual positioner. In other embodiments, the objective positioner 202 may be controlled by a processor 204 or another processing device.

A rotational positioner 206 rotates the microscope assembly 102A about a rotational axis 208, such as the optic axis 124, the illumination axis 112, or another axis. The rotational positioner 206 rotates the microscope assembly 102A in one or more selected directions, such as clockwise and counter-clockwise. In some embodiments, the rotational positioner 206 may be a manual positioner, while in other embodiment the rotational positioner 206 may be controlled by a processor 204 or another device. As further shown, a vertical positioner 210 raises and lowers the microscope assembly 102A. In some embodiments, the vertical positioner 210 may be a manual positioner, while in other embodiments the vertical positioner 210 is controlled by a processor 204 or another device.

In one embodiment, a scan direction positioner 212 may move the microscope assembly 102A in the alternate scan direction 142, such as in the horizontal or in another scanning direction. In other embodiments, the scan direction positioner 212 may be a manual positioner, while in other embodiments the scan direction positioner 212 may be controlled by a processor 204 or another device. The alternate scan direction positioner 212 is an optional component.

The processor 204 receives two-dimensional images from the detector 126. In addition, the processor 204 processes the two-dimensional images to create a three-dimensional image of the sample 136. In some embodiments, the processor 204 may control the detector 128 and its operation, including the detection and collection of images. In one embodiment, the processor 204 includes volatile and non-volatile memory that stores operating software or firmware, imaging software or firmware, and images. The processor 204 is an optional component.

The processor 204 may control how and when the objective positioner 202 changes the position of the microscope assembly 102A. In other embodiments, the processor 204 may not control the position of the objective positioner 202.

Referring back to FIG. 2, the microscope assembly 102A may be coupled to a frame 214 that enables the rotational positioner 206 and the vertical positioner 210 to change the position and/or orientation of the microscope assembly 102A relative to the reference plane 134 of the sample 136 or another orientation reference. The frame 214 may be coupled to the optical assembly 116A or another portion of the microscope assembly 102A. For example, the frame 214 may be fixedly, movably, or removably coupled to illumination source 104, the optical tube 118, the detector 126, the coupler 132, and/or another portion of the microscope assembly 102. Other examples exist. The frame may be configured to rest on or be attached to a table, workbench, other structure, or surface.

The frame 214 is optional in some embodiments. In some embodiments, the frame does not exist, and the rotational positioner 206 and vertical positioner 210 may operate on another portion of the microscope assembly 102 to change the orientation of the microscope assembly relative 102 to the reference plane 134 of the sample 136 or another orientation reference.

Figure 3:
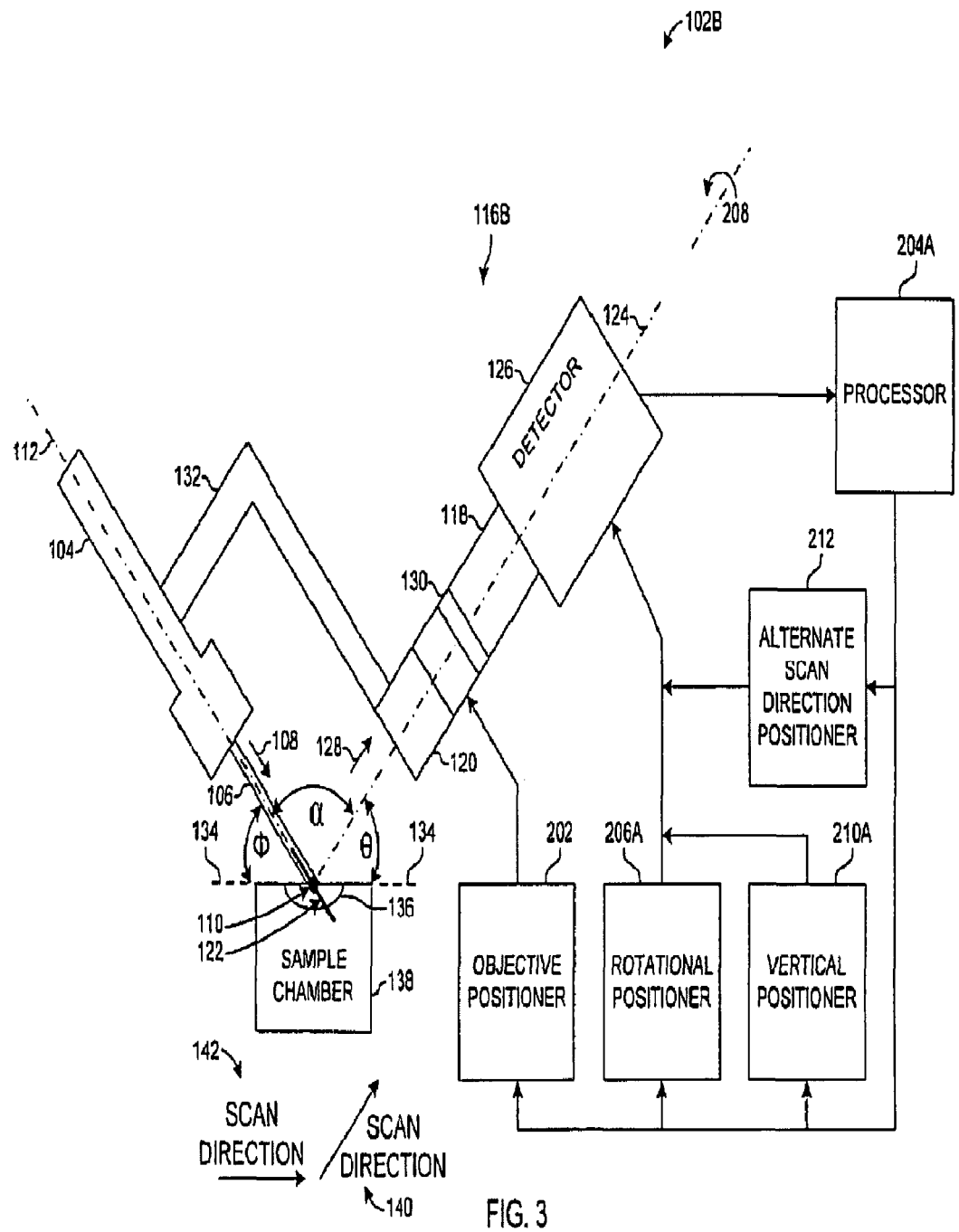
FIG. 3 is a simplified block diagram of yet another embodiment microscope system.

FIG. 3 depicts another embodiment of a microscope assembly 102B.

FIG. 3 shows an optical assembly 116B having a processor 204A that controls the rotational positioner 206A and the vertical positioner 210A. The processor 204 receives orientation instructions for the microscope assembly 102B and controls how and when the rotational positioner 206 and/or the vertical positioner 210 changes the position and/or orientation of the microscope assembly 102B. The orientation instructions may be received from one or more data entry devices, another processor, one or more sensors, one or more switches, or other devices. A frame 214 is not depicted in the embodiment of FIG. 3. However, the embodiment of FIG. 3 may include the frame 214 of FIG. 2 in one example. In this example, the rotational positioner 206 and the vertical positioner 210 operate to change the position and/or orientation of the microscope assembly 102 on or with reference to the frame 214.

It will be appreciated that the microscope assembly 102 has many benefits. Because the illumination source 104 is coupled to the objective, as the objective is focused in or out, the plane of illumination moves with the focal plane. This ensures that the illumination plane always stays in the focal plane.

The microscope assembly 102 avoids the problems with blur and out-of-focus backgrounds in images that make the epifluorescence image hard to interpret. High signal-to-noise images are obtained by using this system. Little photo bleaching occurs when recording images by the microscope assembly 102.

Since the entire focal plane is illuminated simultaneously, images can be acquired rapidly, with theoretical limits in the range of a million frames per second. The limitation on the number of frames imaged is only restricted by current camera technology.

Because the illumination source 104 is coupled to the objective 120, the entire microscope assembly may be raised, lowered, or rotated so that samples may be rapidly scanned in three dimensions without having to move the sample or the sample chamber. Since the illumination source and the objective are positioned with one or more positioners, samples may be more rapidly scanned. Positioning the microscope assembly up, down, and rotationally with respect to the sample also enables large samples to be imaged.

Moving the microscope assembly 102 rather than the sample results in the sample being more stable in the sample chamber, which results in a greater resolution of a sectional image. High-speed optical sectioning is thereby improved for the three-dimensional image reconstruction.

The systems and methods may be used for optical imaging in a variety of technologies, including surgical applications and other real-time three-dimensional microscopy. The systems and methods may also be used for imaging thick tissues and other tissues and for non-tissue imaging uses.

Those skilled in the art will appreciate that variations from the specific embodiments disclosed above.

What is claimed is:

1. A system for imaging comprising:
    an illumination source (104) configured to generate a thin light blade (106) to an illumination plane (110) and comprising fiber configured to carry a beam of light and an optic assembly (114) configured to focus the beam of light into the thin light blade (106) and to the illumination plane (110);
    an objective (120) having optics and an optic axis (124) and configured to focus the optics at a focal plane (122) and to move along the optic axis (124);
    a coupler (132) configured to couple the illumination source (104) to the objective (120) at a coupling angle, to move the illumination source (104) with the objective (120) in a scan direction along the optic axis (124), and to restrict the illumination plane (110) to the focal plane (122) as the objective (120) and the illumination source (104) move along the optic axis (124); and
    a detector (126) configured to detect at least one projected image from the illuminated focal plane (122) through the objective (120);
    wherein at least the illumination source (104) and the objective (120) are tilted at a tilt angle, wherein the coupling angle is approximately orthogonal.

2. The system of claim 1, wherein the illumination source (104) is configured to generate the thin light blade (106) at an illumination angle between the illumination plane (110) and a reference plane (134).

3. The system of claim 2 wherein the illumination angle comprises an angle between approximately 30 and 60 degrees, and the reference plane (134) comprises a sample reference plane.

4. The system of claim 1 further comprising an objective positioner (202) configured to move the objective (120) in and out along the optic axis (124).

5. The system of claim 4 wherein the objective positioner (202) further is configured to move the objective (120), coupler (132), and illumination source (104) in the scan direction along the optic axis (124).

6. The system of claim 1, further comprising a rotational positioner (206) configured to rotate at least the objective (120), the coupler (132), and the illumination source (104) about a rotational axis.

7. The system of claim 6 wherein the rotational axis comprises at least one member of a group consisting of the optic axis (124) and an illumination axis (112).

8. The system of claim 1, further comprising a vertical positioner (210) configured to raise and lower at least the objective (120), the coupler (132), and the illumination source (104).

9. The system of claim 1, further comprising a processor (204) configured to control movement of at least rotational and vertical positions of at least the objective (120), the coupler (132), and the illumination source (104).

10. A microscope assembly (102) for imaging samples (136) comprising:
    an illumination source (104) configured to generate a thin light blade (106) to an illumination plane (110);
    an objective (120) comprising a lens and an optic axis (124) and configured to focus the lens at a focal plane (122) along the optic axis (124);
    a coupler (132) configured to couple the illumination source (104) and the objective (120) and to restrict the illumination plane (110) to the focal plane (122) as the objective lens moves the focal plane (122) along the optic axis (124); and a detector (126) configured to detect at least one projected image from the illuminated focal plane (122) through the objective (120) wherein the coupler (136) is configured to couple the illumination source (104) and the objective (120) at a coupling angle that is approximately orthogonal.

11. The microscope assembly (102) of claim 10, wherein the illumination source (104) comprises fiber configured to carry a beam of light and an optic assembly (116) configured to focus the beam of light into the thin light blade (106) and to the illumination plane (110).

12. The microscope assembly (102) of claim 11 wherein at least the illumination source (104) and the objective (120) are tilted at a tilt angle.

13. The microscope assembly (102) of claim 10, further comprising a positioner configured to move the microscope assembly (102) in a scan direction along the optic axis (124).

14. The microscope assembly (102) of claim 10 further comprising a positioner configured to move the microscope assembly (102) in a scan direction along a reference plane (134).

15. The microscope assembly (102) of claim 10 further comprising a rotational positioner (206) configured to rotate the microscope assembly (102) about a rotational axis.

16. The microscope assembly (102) of claim 15 wherein the rotational axis comprises at least one member of a group consisting of the optic axis (124) and an illumination axis (112).

17. The microscope assembly (102) of claim 10, further comprising a processor (204), wherein the processor (204) is configured to control at least rotational and vertical positions of the microscope assembly (102).

18. A method for imaging comprising:

providing an illumination source (104) configured to generate a thin light blade (106) to an illumination plane (110) and comprising:

providing fiber configured to carry a beam of light; and providing an optic assembly (114) configured to focus the beam of light into the thin light blade (106) and to the illumination plane (110);

providing an objective (120) having optics and an optic axis (124), the objective configured to focus the optics at a focal plane (122) and to move along the optic axis (124);

coupling the illumination source (104) to the objective (120) at a coupling angle, wherein the coupling angle is approximately orthogonal, for moving the illumination source (104) with the objective (120) in a scan direction along the optic axis (124) and restricting the illumination plane to the focal plane as the objective and the illumination source (104) move along the optic axis (124);

tilting at least the coupled illumination source (104) and the objective at a tilt angle in a synchronized movement; and detecting at least one projected image from the illuminated focal plane through the objective (120).

* * * * *